US009500512B2

(12) United States Patent
Schmidt et al.

(10) Patent No.: US 9,500,512 B2
(45) Date of Patent: Nov. 22, 2016

(54) PROBE UNIT (75) Inventors: Robert Schmidt, Schopfheim (DE); Andreas Krumbholz, Maulburg (DE)

(73) Assignee: Endress + Hauser GmbH + Co. KG, Maulberg (DE)

( * ) Notice: Subject to any disclaimer, the term of this patent is extended or adjusted under 35 U.S.C. 154(b) by 382 days.

(21) Appl. No.: 14/001,729

(22) PCT Filed: Feb. 5, 2012

(86) PCT No.: PCT/EP2012/050119
§ 371 (c)(1),
(2), (4) Date: Aug. 27, 2013

(87) PCT Pub. No.: WO2012/116851
PCT Pub. Date: Sep. 7, 2012

(65) Prior Publication Data
US 2013/0333466 A1 Dec. 19, 2013

(30) Foreign Application Priority Data
Feb. 28, 2011 (DE) ........................ 10 2011 004 807

(51) Int. Cl.
*G01F 23/26* (2006.01)
*G01F 23/24* (2006.01)

(52) U.S. Cl.
CPC ............ *G01F 23/26* (2013.01); *G01F 23/242* (2013.01); *G01F 23/268* (2013.01)

(58) Field of Classification Search
CPC .. G01F 23/268; G01F 23/263; G01F 23/266; G01F 23/265; G01F 23/26
USPC ...................................................... 73/304 C
See application file for complete search history.

(56) References Cited

U.S. PATENT DOCUMENTS

| 4,027,172 A | 5/1977 | Hamelink |
| 4,296,472 A | 10/1981 | Sarkis |

(Continued)

FOREIGN PATENT DOCUMENTS

| DE | 3036347 A1 | 5/1981 |
| DE | 3211385 A1 | 8/1983 |
| DE | 4244460 C1 | 4/1994 |
| DE | 19516809 C1 | 9/1996 |
| DE | 10106479 A1 | 8/2002 |

(Continued)

OTHER PUBLICATIONS

German Search Report, German Patent Office, Munich, Jun. 7, 2011.

(Continued)

*Primary Examiner* — Eric S McCall
*Assistant Examiner* — Mohammed E Keramet-Amircola
(74) *Attorney, Agent, or Firm* — Bacon & Thomas, PLLC (57) ABSTRACT A probe unit comprising a probe housing, an at least sectionally rod-shaped, probe electrode, a supplemental electrode, which surrounds the probe electrode at least sectionally coaxially and is isolated from the probe electrode by an electrical insulation. A first securement means, by means of which the supplemental electrode is secured in the probe housing is included, and a contacting module, which is mountable on a rod-shaped section of the probe electrode arranged in the probe housing, and which has a flexible circuit board having at least one first conductive trace for electrically contacting the probe electrode and at least one second conductive trace for electrically contacting the supplemental electrode, and a second securement means for securing the contacting module on the probe electrode are provided.

9 Claims, 5 Drawing Sheets

(56) References Cited

U.S. PATENT DOCUMENTS

| | | | |
|---|---|---|---|
| 5,639,956 A * | 6/1997 | Christy | 73/19.01 |
| 6,178,818 B1 | 1/2001 | Plochinger | |
| 6,289,714 B1 * | 9/2001 | Tartre | 73/19.01 |
| 6,945,120 B1 | 9/2005 | Marcus | |
| 7,210,346 B1 | 5/2007 | Hoover | |
| 7,487,793 B2 | 2/2009 | Schmitz | |
| 2003/0233875 A1 | 12/2003 | Stehman | |
| 2004/0154414 A1 * | 8/2004 | LaCourse et al. | 73/863.23 |
| 2010/0044809 A1 * | 2/2010 | Dangtran et al. | 257/415 |
| 2011/0000313 A1 * | 1/2011 | Eckhardt et al. | 73/861.61 |
| 2013/0033841 A1 * | 2/2013 | Eckhardt et al. | 361/784 |

FOREIGN PATENT DOCUMENTS

| | | |
|---|---|---|
| EP | 1666779 A2 | 6/2006 |
| FR | 8210083 | 8/1983 |

OTHER PUBLICATIONS

International Search Report, EPO, The Netherlands, Apr. 18, 2012.
English translation of International Preliminary Examination Report in corresponding International Application No. PCT/EP2012/050119, dated Sep. 12, 2013.

* cited by examiner

PROBE UNIT

TECHNICAL FIELD

The present invention relates to a probe unit with an at least sectionally coaxial construction. Especially, the invention relates to a probe unit for an apparatus for capacitive or conductive determining of at least one process variable of a medium in a container. The process variable is, for example, the fill level and/or the electrical conductivity and/or the permittivity of the medium.

BACKGROUND DISCUSSION

Measuring devices using capacitive or conductive principles are equipped, as a rule, with an essentially cylindrical probe unit, which is introducible into the container. Known for fill level measurement, on the one hand, are rod-shaped, probe units reaching vertically into the container for continuous determining of fill level, while known for limit level measurement, on the other hand, are probe units introducible into the wall of the container. Both variants have at least one probe electrode. Especially in the case of the embodiment of the probe unit for limit level registration, the probe electrode is surrounded preferably at least in the region of the process connection coaxially by a guard electrode, wherein the guard electrode and the probe electrode are isolated from one another by electrical insulation. Via the capacitance between container wall and the probe electrode and/or between the medium and the probe electrode, the fill level of the medium in the container is determinable.

Methods for capacitive fill level measurement are disclosed, for example, in the Offenlegungsschrifts, German laid-open applications, DE 10157762 A1 and DE 10161069 A1.

Known from the state of the art for contacting electrodes are, on the one hand, cables with wires, wherein the wires are soldered onto contacting elements and the cables terminate in a shared plug. On the other hand, flexible circuit boards are used for different applications. For example, European application EP 1378014 B1 describes a flexible circuit board for contacting piezoelectric elements arranged in a stack. For this, the circuit board includes a plurality of contact plates, which, by bending back and forth, can be adhered between the piezoelectric elements. This contacting method, indeed, saves space; the applying of the contact plates, however, requires some time and dexterity.

SUMMARY OF THE INVENTION

An object of the invention is to provide a simple contacting option for a probe unit having, at least sectionally, a coaxial construction.

The object is achieved by a probe unit comprising a probe housing, an at least sectionally rod-shaped, probe electrode, a supplemental electrode, which surrounds the probe electrode at least sectionally coaxially and is isolated from the probe electrode by an electrical insulation, a first securement means, by means of which the supplemental electrode is secured in the probe housing, a contacting module, which is mountable on a rod-shaped section of the probe electrode arranged in the probe housing, and which has a flexible circuit board having at least one first conductive trace for electrically contacting the probe electrode and at least one second conductive trace for electrically contacting the supplemental electrode, and a second securement means for securing the contacting module on the probe electrode.

The invention is, in principle, suitable for all probe units having two elements to be contacted, which are arranged at least sectionally in a coaxial construction. The invention is especially suitable for probe units of apparatuses for capacitive or conductive determining of at least one process variable of a medium in a container. The electrode lying inwardly in the coaxial construction serves, in such case, as holder for the contacting module, for which, at least in a section, whose length corresponds to the height of the contacting module and a securement means, it is not surrounded by the outer electrode.

The insulation between probe electrode and supplemental electrode can be provided by an element of an electrically insulating material, such as synthetic material, for instance a plastic, or glass, or in the form of an air gap. A combination of these two measures is likewise possible. The probe housing is preferably metal and lies at ground potential.

In a first embodiment of the probe unit of the invention, the contacting module includes, besides the circuit board, an insulating sleeve and a module housing, wherein the insulating sleeve has an essentially cylindrical, basic body for accommodating a section of the rod-shaped, probe electrode and, directed essentially orthogonally to the basic body, a 2-dimensional bearing element, which divides the basic body in a first section and a second section, wherein the circuit board has in an end region a first contact region, in which the first conductive trace terminates, and a second contact region, in which the second conductive trace terminates, wherein the second contact region can be made by folding over to coincide with the first contact region, wherein the first contact region and the second contact region each have a central hole, whose diameter at least equals the outer diameter of the basic body of the insulating sleeve, so that the first contact region is mountable on the first section of the basic body and the second contact region on the second section of the basic body, and wherein the module housing holds the construction of bearing element and contact areas of the circuit board together. The bearing element serves to support the two contact areas of the circuit board. At the same time, the bearing element assures the electrical isolation between the two contact areas. These are preferably ring-shaped and connected via a web with one another, so that the two holes are positionable on top of one another by folding over of the second contact area. The two sections, into which the bearing element divides the basic body of the insulating sleeve, can be equally or differently long. In order to fix the positions of the two contact areas of the flexible circuit board, the bearing element is placed in a module housing. The module housing is manufactured of an electrically insulating material, preferably of a synthetic material, such as a plastic.

In an additional embodiment, the contacting module includes a first contact plate, which is embodied in such a manner that it is mountable on the first section of the basic body of the insulating sleeve and electrically contacts the first conductive trace in the first contact region. The first contact plate is manufactured of a metal or a metal alloy and serves for contacting the probe electrode. For this, either the first contact plate contacts the probe electrode directly, or it contacts an intermediate, electrically conductive element connected with the probe electrode.

In the case of an additional embodiment, the contacting module includes a second contact plate, which is embodied in such a manner that it is mountable on the second section of the basic body of the insulating sleeve and electrically contacts the second conductive trace in the second contact region. The second contact plate is manufactured of a metal or a metal alloy and serves for contacting the supplemental electrode. The second contact plate effects a safer contact between the supplemental electrode and the second conductive trace and represents additionally protection of the flexible circuit board against damage upon the securing of the contacting module. The shape of the contact plate is so matchable to the conductive trace that the contact area is maximized. Additionally, the contact plate as component of the contacting module is in solid contact with the second conductive trace. In this way, the production of a lasting conductive contact between supplemental electrode and second conductive trace is simplified.

In a further development of the invention, the contacting module includes a twist preventing element, which is introducible into the module housing and prevents a twisting of the circuit board upon tightening of the second securement means. The twist preventing element is preferably arranged above the first contact region of the circuit board or the first contact plate. Preferably, the twist preventing element is not mounted on the insulating sleeve, but, instead, has a hole diameter fitting the rod-shaped section of the probe electrode, so that the twist preventing element lies against the probe electrode after the mounting of the contacting module. In an advantageous embodiment, the twist preventing element is essentially ring-shaped. In order to fulfill the function of twist prevention, the twist preventing element includes at least one engagement means protruding from the module housing, for example, in the form of two hook-like structures, which engage the module housing and, thus, prevent rotational movement of the twist preventing element. In an embodiment, the twist preventing element is so embodied that it simultaneously performs the function of the first contact plate and, thus, replaces such.

In the case of an additional further development, the module housing is embodied in such a manner that the additional elements of the contacting module are capable of being snapped or slid into the module housing. The terminology, snapped in, means that the elements are introducible into the module housing by the exertion of pressure, in contrast to introduction by just sliding in; however, in the module housing there can still be play in the radial direction. The module housing surrounds the provided elements in a shell-like manner, but, however, not completely. The opening of the module housing is sufficiently large that the elements can be introduced into the module housing. After introduction, however, they cannot fall out. The insertable additional elements of the contacting module are in the simplest case the insulating sleeve and the circuit board, wherein the bearing element is essentially brought into the module housing with the contact areas. Other, optionally present elements of the contacting module are the first contact plate, the second contact plate and the twist preventing element.

In an embodiment of the invention, the probe electrode is free of the supplemental electrode in an end region extending into the probe housing, and the contacting module is mounted on the probe electrode in such a manner that the second contact region or the second contact plate lies at least partially on the supplemental electrode. The contacting module lies then with an underside on the outer electrode, so that the contacting is produced upon the mounting of the contacting module on the probe electrode.

An embodiment of the probe unit of the invention provides that the first securement means is a nut, which is mounted on the supplemental electrode and/or the second securement means is a nut, which is mounted on the probe electrode.

Another embodiment provides that, between the contacting module and the second securement means, a resilient element or a simultaneously tightened, resilient locking means is provided for resisting unscrewing. The resilient element is, for example, a Belleville- or helical spring and assures that the compressive pressure exerted by the second securement means on the contacting module is always present. The simultaneously tightened, resilient locking means for resisting unscrewing is preferably a ring- or washer shaped element, for example, an annular spring or a toothed washer, for protecting the second securement means against unintended release.

In an additional embodiment, the first securement means has at least one cavity and the contacting module has at least one engagement means, which is introducible into the cavity. Preferably, the first securement means is a castellated, or slotted, nut. The slots represent the cavity. The module housing has then preferably two engagement means, for example, in the form of lugs, so that the module housing is at least loosely affixable in the nut. This acts as a positioning aid, in the case of the insertion of the module, and as a twist prevention, in the case of the securing of the second securement means, especially in case the second securement means is a nut tightenable on the probe electrode.

A further development of the probe unit of the invention provides that a plug for connection with an electronics unit is secured on a second end region of the circuit board. The electronics unit is arranged, for example, in an electronics cap connected with the probe housing. In a further development associated therewith, a socket is provided, via which the plug is positionable in the probe housing.

According to the invention, the contacting of the two electrodes is implemented in the form of a module. The contacting module is embodied as a premountable, insertion part, so that the contacting in the case of assembling the probe unit requires only few steps. It is only necessary to put the contacting module on the probe electrode and to apply and secure the second securement means. In given cases, a socket for affixing the flexible circuit board and a plug mounted on the circuit board for connection of the contacting module with an electronics unit in the probe housing are then applied. The electrically conductive contact between the conductive traces on the flexible circuit board and the two electrodes is produced purely mechanically, i.e. without adhesion or soldering, by compressive pressure applied by means of the second securement means. In this way, the risk of defective solder- or adhesive locations is absent and a lasting electrical contact is assured. Additionally, no cumbersome soldering in the probe housing is required.

The module housing, as well as the, in given cases present, contact plates, are preferably symmetrically embodied, so that, in mounting the contacting module, its orientation is not a concern. Preferably, the first and second contact plates are additionally identically constructed, so that no mix up of the two parts is possible. This simplifies and accelerates the mounting of the contacting module.

BRIEF DESCRIPTION OF THE DRAWINGS

The invention will now be explained in greater detail based on the appended drawing, wherein equal parts are provided with equal reference characters. The figures of the drawing show as follows.

DETAILED DISCUSSION IN CONJUNCTION
WITH THE DRAWINGS

Figure 1:
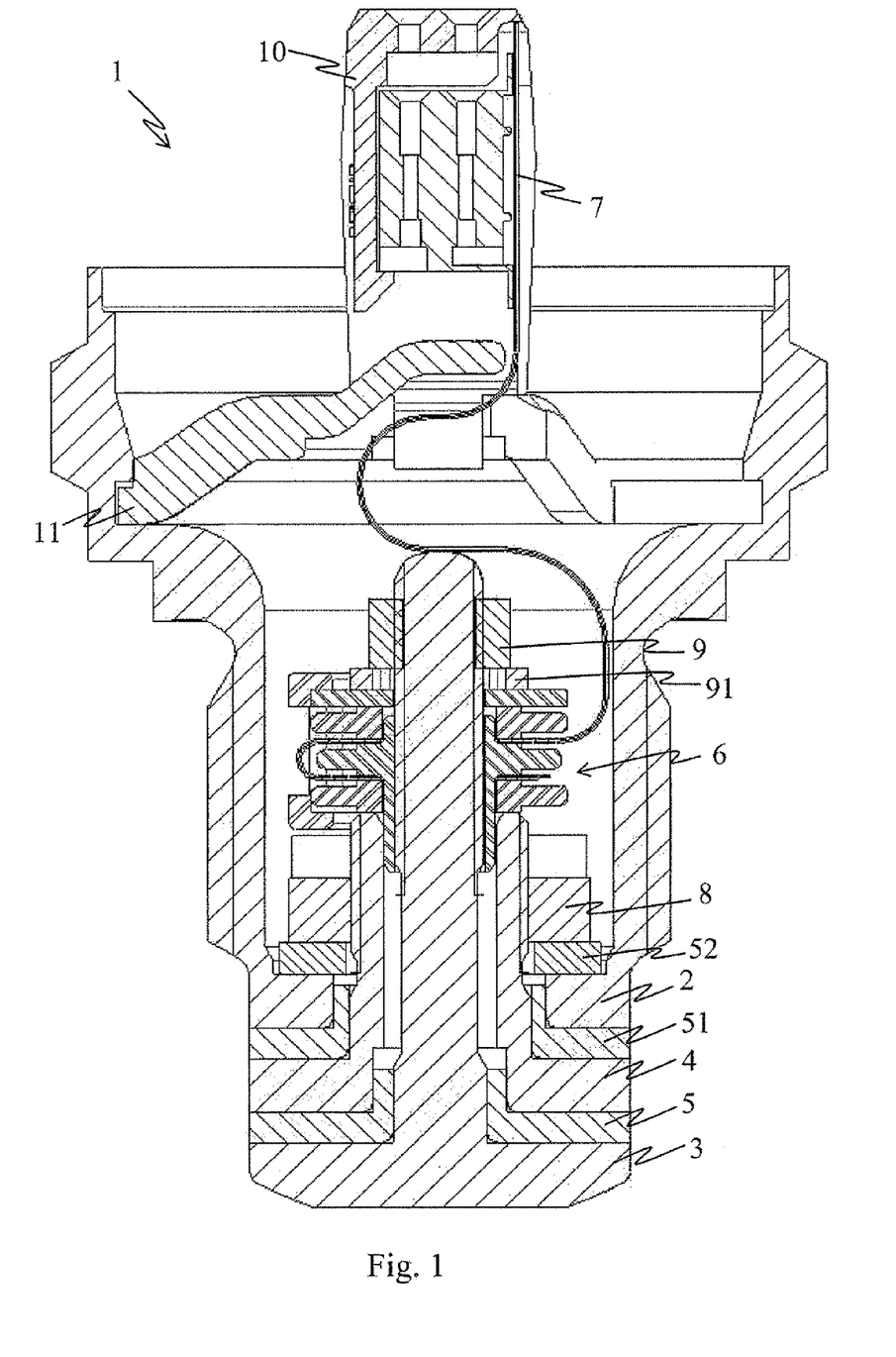
FIG. 1 is a schematic construction of a probe unit in a sectional illustration.

FIG. 1 is a schematic illustration of a probe unit 1 with assembled contacting module 6. The components of the contacting module 6 are made distinctive by double hatching. Probe unit 1 includes a probe electrode 3, which extends inwardly into the probe housing 2 with a rod-shaped section. Probe electrode 3 is isolated from a supplemental electrode 4 via insulation 5. Supplemental electrode 4 coaxially surrounds the probe electrode 3. Supplemental electrode 4 is shorter than the probe electrode 3 in the direction of the housing interior, so that the probe electrode 3 protrudes beyond the supplemental electrode 4 into the probe housing 2. Such probe units 1 are used especially in capacitive fill-level measuring devices. Probe electrode 3 serves, as a rule, for the actual measuring, while the supplemental electrode 4 functions as a guard electrode. In other words, the supplemental electrode 4 lies at the same potential as the probe electrode 3 and improves accretion insensitivity in the case of measuring accretion forming media.

Probe unit 1 can be introduced via the probe housing 2 into the container with the medium. For this, the probe housing 2 includes, for example, a screw thread, via which it can be screwed into the wall of the container in a receptacle with matching thread. Probe housing 2 can serve, besides as protection of the elements accommodated by it against environmental influences such as condensation, also as a ground electrode.

Probe housing 2 is sectionally tubular and includes a tapered section, where the electrodes 3, 4 are secured. Probe electrode 3, insulation 5, supplemental electrode 4, tapered section and an insulating unit 51 for electrical isolation between supplemental electrode 4 and tapered section, respectively probe housing 2, form an axial construction, wherein the longitudinal axis of the probe housing 2 forms the axis. Located in the probe housing 2 is a first securement means in the form of a nut 8, which is mounted on the tubular section of the supplemental electrode 4 extending in the probe housing 2 and pulls the section of the supplemental electrode 4 lying on the other side of the tapered section against the tapered section. An insulating unit 52 insulates the first nut 8 in electrically conductive contact with the supplemental electrode 4 from the probe housing 2. A second securement means in the form of a second nut 9 is mounted on the rod-shaped section of the probe electrode 3 arranged in the probe housing 2 and is tightenable by means of a threaded engagement. Since the probe electrode 3 forms outside of the probe housing 2 the outermost element of the axial construction, the securing of the second nut 9 effects a tightening force directed toward the housing interior on the elements of the axial construction and, thus, a fixed connection of the individual elements.

The second nut 9 bears in the axial direction not only on the supplemental electrode 4 with interpositioning of insulation, such as would be the case when contacting the electrodes 3, 4 via solder connected cable. But here, a contacting module 6 is arranged between the supplemental electrode 4 and the second nut 9. The second nut 9 presses the contacting module against the supplemental electrode 4. The individual elements of an advantageous embodiment of the contacting module 6 are described in connection with FIG. 2. Preferably located between the contacting module 6 and the second nut 9 is a toothed washer 91. Instead of the toothed washer 91, some other simultaneously tightened, resilient element, or spring element, for example, one or more Belleville springs or a helical spring, can be mounted on the probe electrode 3. In this way, thermal expansion effects in the axial direction are compensated, whereby a continuous tightening force of the second nut 9 and, thus, a lasting contact of the electrical connections produced via the contacting module 6 are assured. The always present compressive pressure prevents a shifting of the relative position of contact region 71, 74 and contacting element, for example, a contact plate 65, 66.

Via the cylindrical, basic body 64 of the insulating sleeve 62, the contacting module 6 can in simple manner be slid onto the probe electrode 3. Insulating sleeve 62 effects furthermore an exact centering of the rod-shaped section of the probe electrode 3 in the tubular section of the supplemental electrode 4 and prevents damaging of the flexible circuit board 7 on the screw thread provided in the rod-shaped section of the probe electrode 3. Additionally, the insulating sleeve 62 assures electrical isolation of the supplemental electrode 4 from the probe electrode 3.

The lugs 68 on the module housing 61 assure, in the case of mounting the contacting module 6 on the probe electrode 3 a better positionability and additionally a better holding of the contacting module 6 upon the tightening of the second nut 9. Because of the arising torque there would exist without the lugs 68 the danger that the module housing 61 would rotate and twist the flexible circuit board 7. The lugs 68, which engage in slots or cavities provided therefor in the first securement means 8, bring about a resistance to the rotational movement, so that the module housing 61 is locked in place and the second nut 9 is sufficiently solidly tightenable. The first nut 8 is preferably a castellated, or slotted, nut, wherein the lugs 68 of the module housing 61 are so embodied that they engage in the slots of the castellated, or slotted, nut. Preferably, there is some space between module housing 61 and nut 8. Also, there is play in the engagement of the lugs 68 in the slots of the nut 8.

The twist preventing element 67, the toothed washer 91 and the second nut 9 are in solid contact with one another and are of an electrically conductive material. The electrical contact between the probe electrode 3 and the first conductive trace 72 on the flexible circuit board 7 is produced, thus, via the first contact plate 65, the twist preventing element 67, the toothed washer 91, and, above all, the second nut 9. The electrical contact between the supplemental electrode 4 and the second conductive trace 75 on the flexible circuit board 7 is produced directly via the second contacting plate, which lies against the end region of the supplemental electrode 4. Through the engaging of the lugs 68, an opportunity is given for checking that the second contact plate 66 is lying against the supplemental electrode 4. When the second nut 9 is securely tightened, a permanent, safe contacting is assured.

The two stage nature of the two nuts 8, 9 protects the construction further against loosening of the nuts 8, 9, for example, in the case of strong shakings or vibrations in a process.

The flexible circuit board 7 is led out from the probe housing 2, so that an electronics unit can access it. To this end, there is provided on the free (i.e. free of the insulating sleeve 62) end region of the circuit board 7 a plug 10, which is connectable with a corresponding counterpart of the electronics unit. The plug 10 includes preferably sockets for contacting the conductive traces 72, 75; it can, however, also have contact pins. For affixing the plug 10 at a desired position, a base 11 is connected with the plug 10. For example, base 11 can engage in a groove in the probe housing 2.

Figure 2:
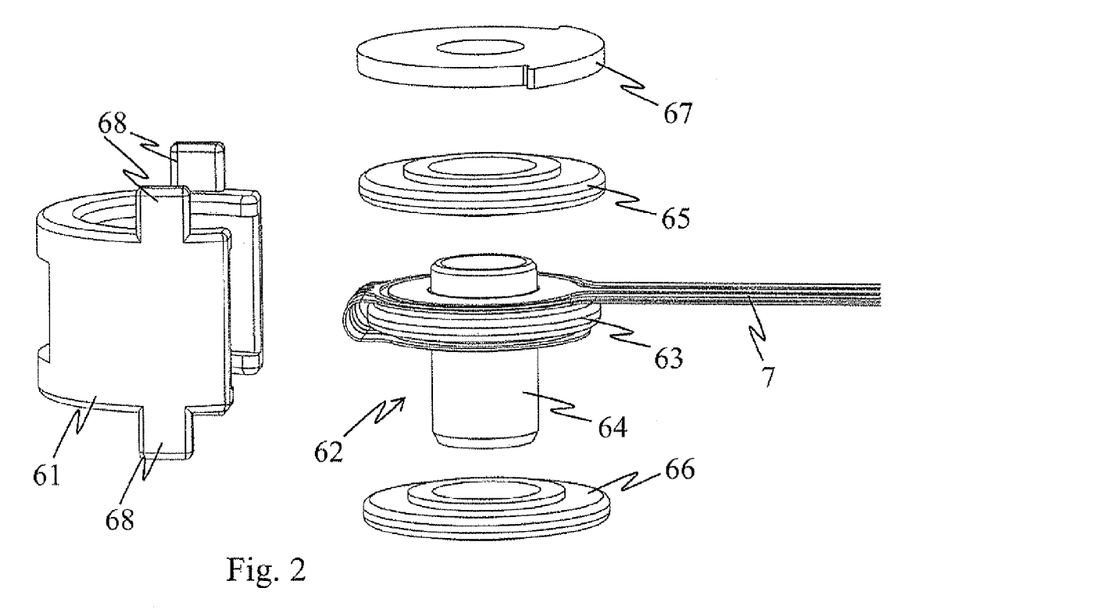
FIG. 2 an advantageous embodiment of a contacting module in an exploded view.

FIG. 2 shows an exploded view of an advantageous embodiment of a contacting module 6. The insulating sleeve 62 forms the core of the contacting module 6. Insulating sleeve 62 is composed of an essentially cylindrical, basic body 64 and a bearing element 63, which is washer shaped and oriented orthogonally to a surface of the basic body 64. The cylindrical, basic body 64 is hollow, so that it can be pushed onto the rod-shaped section of the probe electrode 3. Bearing element 63 divides the basic body 64 into two sections. The section, by which the insulating sleeve 62 extends into the supplemental electrode 4, is, in such case, longer than the other section. In this way, after insertion of the contacting module 6, the centering of the probe electrode 3 in the supplemental electrode 4 is assured.

Preferably, the insulating sleeve 62 is an injection molded or a machined, plastic part. Bearing element 63 serves for bearing the two contact areas 71, 74 of the flexible circuit board 7, which are preferably likewise washer shaped. The circuit board 7 is, in such case, slid onto the insulating sleeve in such a manner that the conductive trace 72, 75 to be contacted is located, in each case, on that side, which faces away from the bearing element 63. The insulating bearing element 63 located between the two contact areas 71, 74 assures, in such case, furthermore, that no short circuits can occur between the two contact areas 71, 74.

Appliable against the circuit board 7 are then, respectively, the contact plates 65, 66 mounted on the basic body 64 of the insulating sleeve 62. In this embodiment, the first contact region 71 is located on the short side of the basic body 64 and the second contact region 74 on the long side. The first contact plate 65 is mountable on the first section of the cylindrical, basic body 64 and lies at least partially against the first contact region 71. The second contact plate, which is mountable on the second section of the basic body 64, is advantageously embodied identically to the first contact plate 65. The contact plates 65, 66 are manufactured of an electrically conductive material, for example, brass, copper, or stainless steel. The shapes of the contact plates 65, 66 are matched to the respective shapes of the contact areas 71, 74 of the circuit board 7 and to that of the insulating sleeve 62, so that the contact plates 65, 66 in this embodiment are likewise washer shaped. Preferably, the contact plates 65, 66 possess in an annular region around the central hole a greater thickness than in the edge region. The thicker regions contact the respectively to be contacted, conductive traces 72, 75, which in the contact region 71, 74 are likewise ring shaped. Since the second conductive trace 75 is led around the first conductive trace 72 in the first contact region 71, the different thicknesses of the first contact plate 65 assure that it only contact the first conductive trace 72. Preferably, the contact plates 65, 66 are symmetrical, i.e. the two side surfaces of each have the raised portions around the center of the washer shape.

The twist preventing element 67 is washer shaped and includes two engagement means in the form of detents. The washer-shaped part is insertable into the module housing 61. The detents are embodied in such a manner that they extend out at least so far from the module housing 61 and contact its wall or surround it such that the twist preventing element 67 is not rotatable in the module housing 61. Advantageously, the twist preventing element 67 is manufactured of an electrically conductive material. The twist preventing element 67 is not slid onto the insulating sleeve 62, but, instead, has a central hole, whose diameter is matched to the diameter of the probe electrode 3. During mounting of the contacting module 6 on the probe electrode 3, the twist preventing element 67 then contacts the probe electrode 3 directly and not the insulating sleeve 62, so that an electrically conductive contact between probe electrode 3 and first conductive trace 72 is produced via the twist preventing element 67 and the first contact plate 65. The thickness of the twist preventing element 67 is preferably uniform.

The module housing 61 is manufactured of an insulating material, wherein this is so selected that the insulating sleeve 62 with the contact plates 65, 66, as well as the twist preventing element 67 are capable of being snapped into the shell-like module housing 61. The construction of bearing element 63, unfolded circuit board 7 and contact plates 65, 66 is held together by the module housing 61. For the section of the circuit board 7, which represents the connection region between the first contact region 71 and the second contact region 74, a cavity is provided in the wall of the module housing 61, so that a compression of this section of the circuit board 7 by the module housing 61 is prevented.

Furthermore, the module housing 61 has preferably at least two oppositely lying lugs 68 arranged on its lower edge. The contacting module 6 is slid onto the probe electrode 3 with the lower edge preceding. The lugs 68 serve, in such case, for positioning the module housing 61, since they engage in corresponding cavities in the first securement means 8.

In an advantageous embodiment, the upper edge of the module housing 61 likewise has two lugs 68, so that the module housing 61 is symmetrical. The symmetry of module housing 61 and the contact plates 65, 66 facilitates and accelerates the mounting of the contacting module 6, since only upon the applying of the circuit board 7 to the insulating sleeve 62 need the orientation of the parts to be mounted be heeded.

Figure 3:
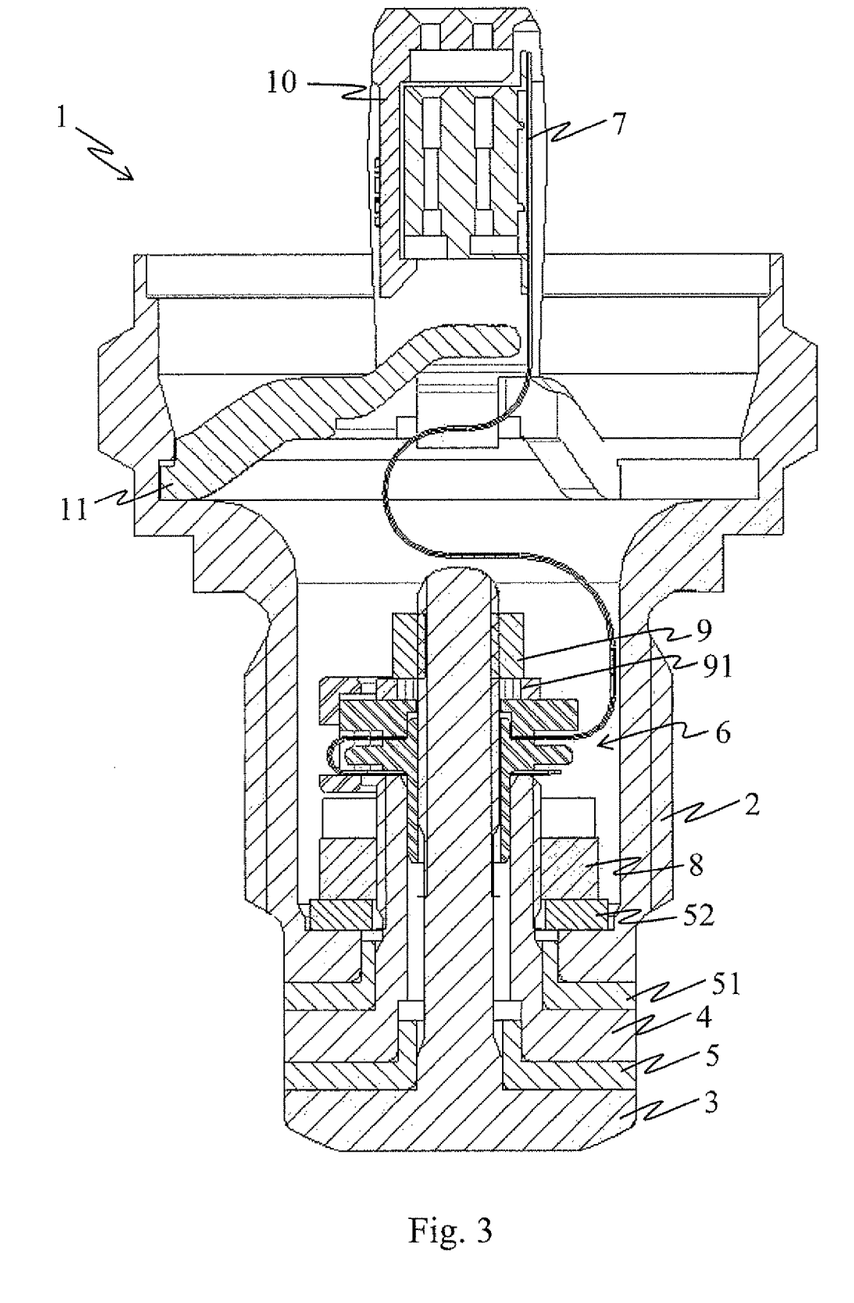
FIG. 3 is another sectional illustration of a probe unit with an alternative form of embodiment of a contacting module.

FIG. 3 shows schematically a probe unit 1 having an alternative form of embodiment of the contacting module 6. The second contact plate 66 is omitted. Instead of that, the supplemental electrode 4 contacts the second conductive trace directly. Also, the first contact plate 65 is omitted. Probe electrode 3 is electrically connected with the first conductive trace 72 via the second nut 9, wherein the twist preventing element 67 produces the conductive contact between second nut 9 and the first conductive trace 72. The twist preventing element 67 performs, thus, a double function as contacting aid and as protection against twisting of the circuit board 7. In order to enable the contacting of the first conductive trace 72, the twist preventing element 67 is changed relative to that of the example of an embodiment illustrated in FIG. 2 such that it has different thicknesses in its interior region as compared with its edge region. The outer section of the first contact area 71 is not contacted by the twist preventing element 67 because of the smaller thickness in the edge region of the twist protection element 67, so that the there extending, second conductive trace 75 is not contacted.

Figure 4:
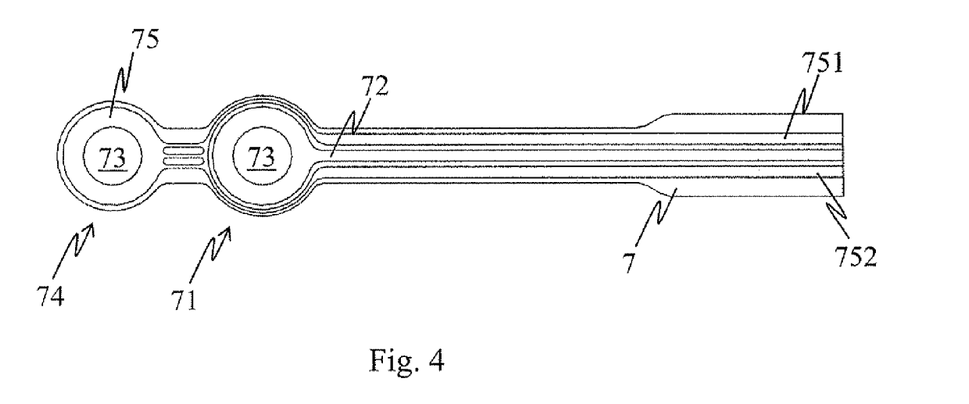
FIG. 4 is a plan view onto a flexible circuit board for a contacting module.

FIG. 4 shows a flexible circuit board 7 before mounting in the contacting module 6. The circuit board 7 is essentially strip shaped and possesses in an end region a first contact region 71 and a second contact region 74, which is connected with the first contact region 71. The strip shaped section is here shown shortened. The second contact region 74 can be brought to at least partially coincide with the first contact region when the second contact region 74 is turned back 180 degrees toward the first contact region. This also includes the case, in which the contact areas 71, 74 have equal shape, but are, however, of different size. The coinciding concerns, thus, essentially the central holes. In this embodiment, the two contact areas 71, 74 are arranged one after the other. Arrangements next to one another or at another angle are, however, likewise possible. In order to match the washer shaped bearing element 63, the contact areas 71, 74 are also washer shaped. The conductive traces 72, 75 in the contact areas 71, 74 are correspondingly ring-shaped. The circular holes in the middle of the contact areas 71, 74 are so dimensioned that the circuit board 7 is mountable via the holes onto the insulating sleeve 62.

In this advantageous embodiment, the circuit board 7 has three conductive traces 72, 751, 752. The first conductive trace 72 extends between the other two conductive traces 751, 752 and terminates in the first contact region 71, where it surrounds the circular hole with a ring-shape. The two outer conductive traces 751, 752 can also be referred to as the second conductive trace 75, since they both terminate in an annular structure around the hole in the second contact region 74 and, thus, carry the same potential. By embodying the second conductive trace 75 in the form of two tracks 751, 752 extending for the most part parallel to one another, redundancy is created, so that the provided electrical signal reaches the second contact region 74 even in the case of damage or a defective contacting of one of the two tracks 751, 752. The second conductive trace 75 is led via the edge region of the first contact region 71 to the second contact region 74, so that the area of the first contact region 71 is somewhat greater than that of the second contact region 74. The line widths of the first conductive trace 72 and the second conductive trace 75 are preferably essentially equal in sections corresponding to one another.

In this embodiment, the internally lying conductive trace is referred to as the first conductive trace 72. Thus, the contact region, in which the internally lying conductive trace terminates, serves for contacting the probe electrode 3. Correspondingly, the circuit board 7, such as shown in FIGS. 1-3, is mounted on the insulating sleeve 62.

The alternative naming of the internally lying conductive trace as the second conductive trace 75 is, however, likewise possible, so that the contact region, in which the internally lying conductive trace terminates, represents the second contact region 74 for contacting the supplemental electrode 4. In this case, the circuit board 7 is mounted correspondingly in such a manner on the insulating sleeve 62 that the contact region, in which the inner conductive trace terminates, is associated with the longer section of the basic body 64 adjoining the supplemental electrode 4 in the assembled state of the probe unit 1.

Figure 5:
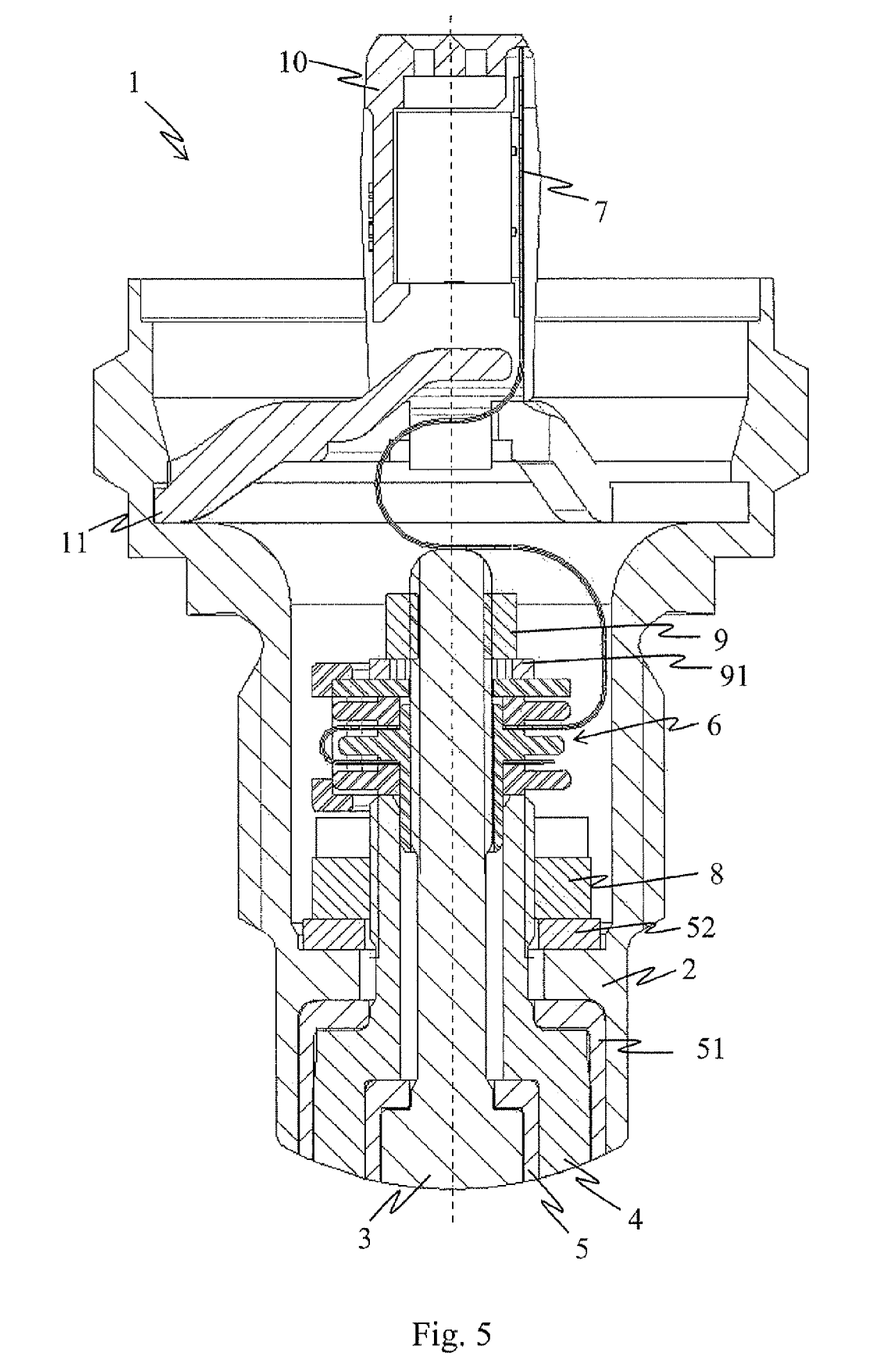
FIG. 5 is a modified probe unit.

FIG. 5 shows a probe unit 1 schematically. Probe unit 1 of FIG. 5 differs from the probe units 1 illustrated in FIGS. 1 and 3 only in the lower portion, i.e. that lying below the tapered section of the probe housing 2. The different embodiments of the contacting module 6 can likewise be mounted in this form of embodiment.

Probe housing 2 continues cylindrically after the tapered section, wherein the central axis of the so formed hollow cylinder coincides with the longitudinal axis of the probe unit 1. Also, the probe electrode 3, the supplemental electrode 4, the insulation 5 between the two electrodes 3, 4 and the insulating unit 51 between supplemental electrode 4 and probe housing 2, terminate, in each case, with a cylindrical section. The electrodes 3, 4 and insulation 5, 51 are in the radial direction always surrounded by the cylindrical section of the probe housing 2 and seal tightly against one another and the probe housing 2, wherein the sealed connection is producible via measures known to those skilled in the art. The electrodes 3, 4, insulation 5, 51 and the probe housing 2 end additionally without offset on a shared surface. Such a probe unit 1 is essentially installable (lushly in a container. This is especially advantageous in the case of applications, which must fulfill high hygienic standards, since, with the flush installation, there are less locations where bacteria can accumulate.

The invention claimed is:

1. A probe unit, comprising:
a probe housing;
an at least sectionally rod-shaped, probe electrode;
a supplemental electrode, which surrounds said probe electrode at least sectionally coaxially and is isolated from said probe electrode by an electrical insulation;
a first securement means, by means of which said supplemental electrode is secured in said probe housing;
a contacting module, which is mountable on a rod-shaped section of said probe electrode arranged in said probe housing, and which has a flexible circuit board having at least one first conductive trace for electrically contacting said probe electrode and at least one second conductive trace for electrically contacting said supplemental electrode; and
a second securement means for securing said contacting module on said probe electrode, wherein:
said contacting module includes, besides the circuit board, an insulating sleeve and a module housing;
said insulating sleeve, an essentially cylindrical, basic body for accommodating a section of said rod-shaped probe electrode and, directed orthogonally to said basic body, a 2-dimensional bearing element, which divides said basic body into a first section and a second section;
said circuit board has in an end region a first contact region, in which said first conductive trace terminates, and a second contact region in which said second conductive trace terminates;
said first contact region and said second contact region each have a central hole, whose diameter at least equals the outer diameter of said basic body of said insulating sleeve;
at least said central holes of said first contact region and said second contact region can be made, by folding over of said circuit board to coincide, so that said first contact region is mountable on said first section of said basic body and said second contact region on said second section of said basic body; and
said module housing holds the construction of said bearing element and said control regions of said circuit board together.

2. The probe unit as claimed in claim 1, wherein:
said contacting module includes a first contact plate, which is embodied in such a manner that it is mountable on said first section of said basic body of said insulating sleeve and electrically contacts said first conductive trace in said first contact region.

3. The probe unit as claimed in claim 1, wherein:
said contacting module includes a second contact plate, which is embodied in such a manner that it is mountable on said second section of said basic body of said insulating sleeve and electrically contacts said second conductive trace in said second contact region.

4. The probe unit as claimed in claim 1, wherein:
said contacting module includes a twist preventing element, which is introducible into said module housing and prevents a twisting of said circuit board upon tightenng of said second securement means.

5. The probe unit as claimed in claim 1, wherein:
said module housing is embodied in such a manner that the elements of said contacting module to be accommodated by said module housing are capable of being slid or snapped into said module housing.

6. The probe unit as claimed in claim 1, wherein:
said probe electrode is free of said supplemental electrode in an end region extending into said probe housing, and said contacting module is mounted on said probe electrode in such a manner that said second conductive trace or said second contact plate lies at least partially on said supplemental electrode.

7. The probe unit as claimed in claim 1, wherein:
said first securement means is a nut, which is mounted on said supplemental electrode and/or that said second securement means is a nut, which is mounted on said probe electrode.

8. The probe unit as claimed in claim 1, wherein:
between said contacting module and said second securement means, a resilient element or a simultaneously tightened, resilient locking means against is provided for resisting unscrewing.

9. The probe unit as claimed in claim 1, wherein:
said first securement means has at least one cavity and that said contacting module has at least one engagement means, which is introducible into said cavity.

* * * * *